C. F. JENKINS.
PICTURE PROJECTING APPARATUS.
APPLICATION FILED MAR. 20, 1913.
1,153,163.
Patented Sept. 7, 1915.
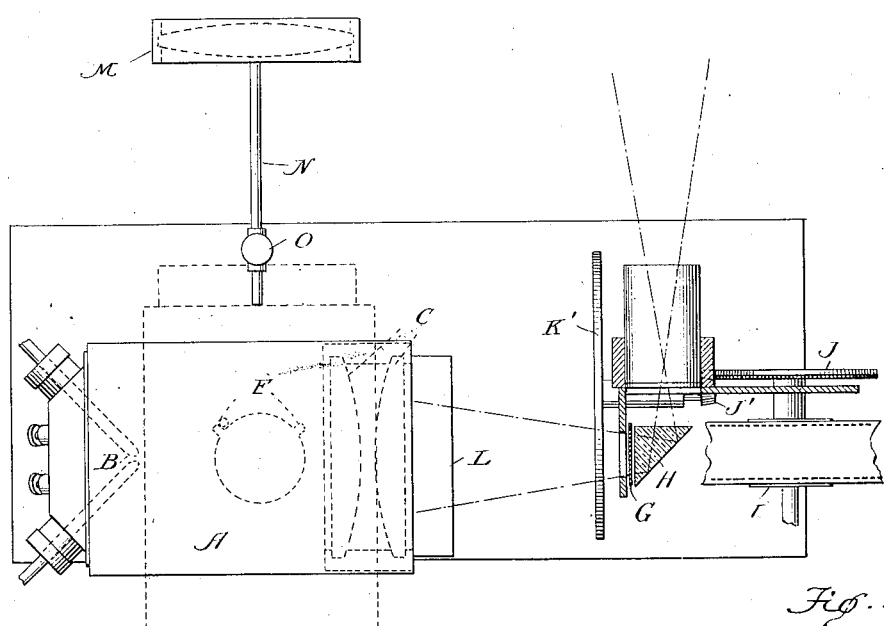
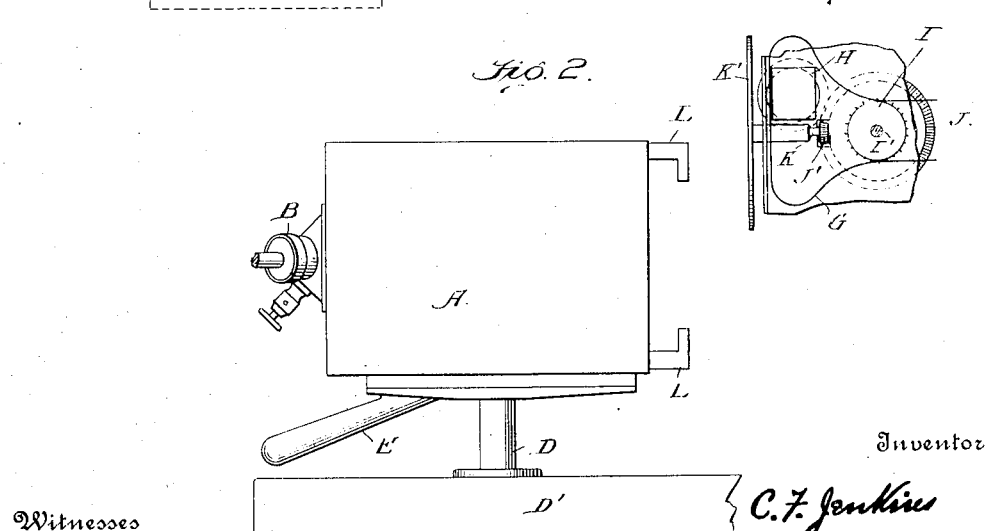
Witnesses
Edwin L. Bradford
Robert Craig Greene
Inventor
C. F. Jenkins
By
Wallace Greene,
Attorney

UNITED STATES PATENT OFFICE.

CHARLES FRANCIS JENKINS, OF WASHINGTON, DISTRICT OF COLUMBIA.

PICTURE-PROJECTING APPARATUS.

1,153,163.  Specification of Letters Patent.  Patented Sept. 7, 1915.

Application filed March 20, 1913. Serial No. 755,751.

*To all whom it may concern:*

Be it known that I, CHARLES FRANCIS JENKINS, a citizen of the United States, residing at Washington, in the District of Columbia, have invented certain new and useful Improvements in Picture-Projecting Apparatus, of which the following is a specification, reference being had therein to the accompanying drawing.

My invention relates to apparatus for projecting motion and other pictures and among its objects are providing devices that when adjusted for projecting motion pictures may be almost instantly adjusted for projecting stationary pictures, or vice versa, that feed a film strip toward and away from the exposure point by a single sprocket drum in the vertical plane of the axial line of the lens, thus eliminating most of the synchronized gearing usually employed, and that deflects the projecting beam so that under no condition of use can it fall upon either the primary or the rewound roll or spool. The sprocket drum constantly feeds the film but intermittent movement of the latter at the exposure point is secured by well known devices acting upon the usual slack or loop portion of the film.

In the accompanying drawings, Figure 1 is a plan view of the apparatus. Fig. 2 is a side elevation of a part of the devices of Fig. 1.

In these figures, A represents a light sheet metal casing or box containing a light B and a projecting lens C, the box being centrally and revolubly mounted upon a standard D, supported by a suitable base D' and about which it may be rotated by a handle E through an angle of preferably 90°, fixed by a common stop device shown in dotted lines at F, Fig. 1.

With the casing in the position shown in full lines, the light passes from the lens through film G and the beam is then turned through an angle of 90° by a reflector or preferably by a prism H, and passes to the usual screen. The film is fed toward and away from the exposure point by a sprocket drum I rotated by a crank shaft I' carrying a gear J engaging a pinion J' upon a shutter shaft K bearing a shutter K', the gears J, J' being the only gears in the machine. The means for intermittently advancing the slack portion of the film at the exposure point being well known in many forms is not here shown. The casing A carries at its lens end projecting members L which are grooved to receive lantern slides or picture bearing transparent plates, and when it is desired to use such plates instead of the motion picture film, the casing is turned to the position shown in dotted lines, where the projecting beam passes through a lens M secured upon a rod N slidingly adjustable in a standard O which may be permanently fixed to the base D' or support for the apparatus as a whole.

What I claim is:

1. In apparatus of the class described, the combination with a plate having an exposure aperture, of means for throwing a projecting beam of light through said aperture, film feeding means upon the opposite side of the plate arranged to feed film across the axial line of said beam, means for deflecting the beam from said line after it passes through the film and before it meets any other obstruction, and a shutter arranged to interrupt the beam periodically before it reaches the plane of the plate.

2. The combination with a projecting lantern mounted to rotate through an angle of 90°, of a plate provided with an exposure aperture in line with a beam from said lantern when at one limit of its path, means in the same vertical plane for feeding motion picture film over said aperture, a prism for deflecting the beam at right angles after it leaves said plate, a shutter in free air between the source of light and said plate, and a lens at an adjustable distance from the lantern and in position to receive the same beam when the lantern is at the opposite limit of its path.

3. The combination with a casing revoluble upon a vertical axis through an angle of 90°, of fixed stops for limiting the rotation in each direction, means within the casing for generating and condensing a projecting beam, a plate provided with an exposure aperture in alinement with the beam when the casing is at one limit of its movement, an adjustable lens in position to aline with the beam when the casing is at the opposite limit of its movement, means in the vertical plane of a beam passing through said aperture for feeding the film over the latter, means for deflecting the beam immediately after it leaves the film at said aperture, and a rotary shutter located in the open air in position to interrupt the beam periodically before it reaches said aperture.

In testimony whereof I affix my signature in presence of two witnesses.

CHARLES FRANCIS JENKINS.

Witnesses:
J. R. WHITE,
JAMES L. CRAWFORD.